United States Patent
Möglich (10) Patent No.: US 10,953,529 B2
(45) Date of Patent: Mar. 23, 2021

(54) PORTABLE MILLING MACHINE HAVING A SPANNER

(71) Applicant: Hilti Aktiengesellschaft, Schaan (LI)

(72) Inventor: Tobias Möglich, Munich (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 16/638,057

(22) PCT Filed: Aug. 8, 2018

(86) PCT No.: PCT/EP2018/071499
§ 371 (c)(1),
(2) Date: Feb. 10, 2020

(87) PCT Pub. No.: WO2019/034492
PCT Pub. Date: Feb. 21, 2019

(65) Prior Publication Data
US 2020/0189008 A1    Jun. 18, 2020

(30) Foreign Application Priority Data
Aug. 18, 2017 (EP) ..................................... 17186776

(51) Int. Cl.
*B25B 33/00* (2006.01)
*B23B 31/06* (2006.01)
*B23C 1/20* (2006.01)

(52) U.S. Cl.
CPC ............ *B25B 33/005* (2013.01); *B23B 31/06* (2013.01); *B23C 1/20* (2013.01);
(Continued)

(58) Field of Classification Search
CPC ............ B23B 31/06; B23B 2231/2081; B25B 33/005; B23C 1/20
See application file for complete search history.

(56) References Cited

U.S. PATENT DOCUMENTS 6,350,087 B1    2/2002   Berry et al.
6,915,722 B2 *  7/2005   Komine ................ B23B 31/201
                                                     279/20
(Continued)

FOREIGN PATENT DOCUMENTS

EP    0765706 A1    4/1997
EP    1629916 A1    3/2006
WO    WO2013/036800 A1    3/2013

OTHER PUBLICATIONS

International Search Report of PCT/EP2018/071499, dated Oct. 23, 2018.

*Primary Examiner* — Eric A. Gates
(74) *Attorney, Agent, or Firm* — Davidson, Davidson & Kappel, LLC (57) ABSTRACT

Portable milling machine having a housing, a spindle and a clamping nut, which, as part of a tool holder, can be rotatably connected to the spindle and detached therefrom in order to clamp and unclamp a milling tool, and the portable milling machine having a spanner, which can be moved relative to the spindle axially between an engaged position and a disengaged position, the spanner interlockingly surrounding the clamping nut at least in portions in the circumferential direction in the engaged position and, when the spanner is in the disengaged position, the clamping nut being rotatable relative to the spanner, the spanner being connected to the housing of the portable milling machine for conjoint rotation such that, when the spanner is in the engaged position, the clamping nut can be connected to the spindle and detached therefrom by manually rotating the spindle.

15 Claims, 5 Drawing Sheets

(52) U.S. Cl.
CPC ... *B23B 2231/2081* (2013.01); *B23B 2270/60* (2013.01); *Y10T 409/309408* (2015.01)

(56) References Cited

U.S. PATENT DOCUMENTS

| | | | |
|---|---|---|---|
| 7,293,944 B2 * | 11/2007 | Lui | B23B 31/02 |
| | | | 279/147 |
| 7,344,141 B2 * | 3/2008 | Schnell | B23B 31/201 |
| | | | 279/150 |
| 9,144,846 B2 * | 9/2015 | Bernardi | B25B 33/005 |
| 2006/0110229 A1 | 5/2006 | Schnell et al. | |

* cited by examiner

Fig. 2

PORTABLE MILLING MACHINE HAVING A SPANNER

The present invention relates to a portable milling machine having a housing, a spindle and a clamping nut. As part of a tool holder, the clamping nut can be rotatably connected to the spindle and detached therefrom in order to clamp and unclamp a milling tool. The portable milling machine has a spanner, which can be moved relative to the spindle axially between an engaged position and a disengaged position, the spanner interlockingly surrounding the clamping nut at least in portions in the circumferential direction in the engaged position. When the spanner is in the disengaged position, the clamping nut is rotatable relative to the spanner.

BACKGROUND

A portable milling machine of the type mentioned at the outset is known in principle from U.S. Pat. No. 6,350,087 B1. In the portable milling machine described in this publication, a spindle of the portable milling machine is blocked by means of a locking pin. By rotating a spanner that can be interlockingly connected to the clamping nut, the clamping nut can be twisted off of a tool holder that is connected to the spindle for conjoint rotation.

SUMMARY OF THE INVENTION

It is an object of the present invention to provide a portable milling machine with an alternative spanner arrangement. In particular, the object of the present invention is to provide a portable milling machine which facilitates one-handed clamping and unclamping of a milling tool.

The present invention provides a spanner being connected to the housing of the portable milling machine for conjoint rotation such that, when the spanner is in the engaged position, the clamping nut can be connected to the spindle and detached therefrom by manually rotating the spindle.

Unlike the portable milling machine known from the prior art, in which the spanner is rotatable relative to the housing of the portable milling machine, in the portable milling machine according to the invention, the spanner is provided so as to rotate together with the housing of the portable milling machine. Accordingly, in the engaged position, i.e. when the clamping nut is interlockingly surrounded by the spanner at least in portions in the circumferential direction, the clamping nut can also rotate together with the housing of the portable milling machine according to the invention. If the spindle of the portable milling machine is then rotated manually, i.e. if the spindle rotates relative to the housing, the clamping nut, which has an internal thread and is screwed to the spindle via an external thread of the spindle, can be detached. Unlike the portable milling machine known from the prior art, the spindle does not have to be blocked, and therefore any undesired lateral forces that may damage the spindle do not occur.

In a particularly preferred embodiment, the portable milling machine comprises a spindle key, which can be moved relative to the spindle axially between a blocked position and a released position. In the blocked position, the spindle key preferably interlockingly surrounds an interlocking connection element at least in portions in the circumferential direction, which element is formed on the spindle and is preferably designed as a spindle nut. The spindle can be rotatable relative to the spindle key when the spindle key is in the released position.

It has been found to be advantageous for the spindle key in the blocked position to be rotatable relative to the housing of the portable milling machine, in order to allow the spindle to be rotated manually.

In a particularly preferred embodiment, the spanner and the spindle key are axially coupled such that movement into the engaged position takes place at the same time as movement into the blocked position and/or movement into the disengaged position takes place at the same time as movement into the released position.

It has been found to be advantageous for the portable milling machine to have an upper sleeve and a lower sleeve on the tool side. The upper sleeve and the lower sleeve preferably each have a manual operation surface. It is also preferable for the upper sleeve and the lower sleeve to be arranged coaxially with the spindle.

In a preferred embodiment, the upper sleeve is rotatably connected to the spindle key such that, when the spanner is in the engaged position and the spindle key is in the blocked position, the clamping nut can be connected to the spindle and detached therefrom by manually rotating the upper sleeve.

In other words, via the upper sleeve, the spindle of the portable milling machine that extends inside the housing can be rotated when the spindle key is in the blocked position. Since, as already mentioned at the outset, the spindle key preferably interlockingly surrounds a spindle nut formed on the spindle in the blocked position, there is optimum distribution of force in the blocked position. By contrast, this is not the case for the punctiform action of force of a locking pin that acts on the spindle, as is provided in a portable milling machine from the prior art.

In a further preferred embodiment, the upper sleeve and the lower sleeve are mounted so as to be rotatable relative to one another. The upper sleeve is preferably mounted in the lower sleeve. The upper sleeve is also preferably fixed in position relative to the lower sleeve in the axial direction.

It has been found to be advantageous for the spanner to be rotatable relative to the spindle key and/or to be rotatable relative to both the upper sleeve and the lower sleeve.

The upper sleeve and the spindle key can be together mounted so as to be movable away from the housing in the axial direction. Alternatively or additionally, the upper sleeve and the spindle key can be rotatably connected to the housing of the portable milling machine.

In a particularly preferred embodiment, the portable milling machine comprises an adjustment spring, against the spring force of which the engaged position and/or the blocked position can be assumed.

The adjustment spring, acting as a compression spring acting between the lower sleeve and the housing, is preferably arranged inside the housing of the portable milling machine. Alternatively, the adjustment spring can be arranged between the spanner and the spindle key in relation to the axial direction. In this case, the adjustment spring acts as a compression spring, by means of the spring force of which the blocked position can be assumed.

It has been found to be advantageous for the spindle key to continuously surround the spindle.

The tool holder preferably has a clamping sleeve which can be arranged coaxially with the spindle and can be operatively connected to the clamping nut.

Further advantages can be found in the following description of the drawings. Various embodiments of the present invention are shown in the drawings. The drawings, the description and the claims contain numerous features in combination. A person skilled in the art will expediently also consider the features individually and combine them to form meaningful further combinations.

BRIEF DESCRIPTION OF THE DRAWINGS

In the drawings, identical and equivalent components are provided with the same reference signs. In the drawings.

DETAILED DESCRIPTION

Figure 1:
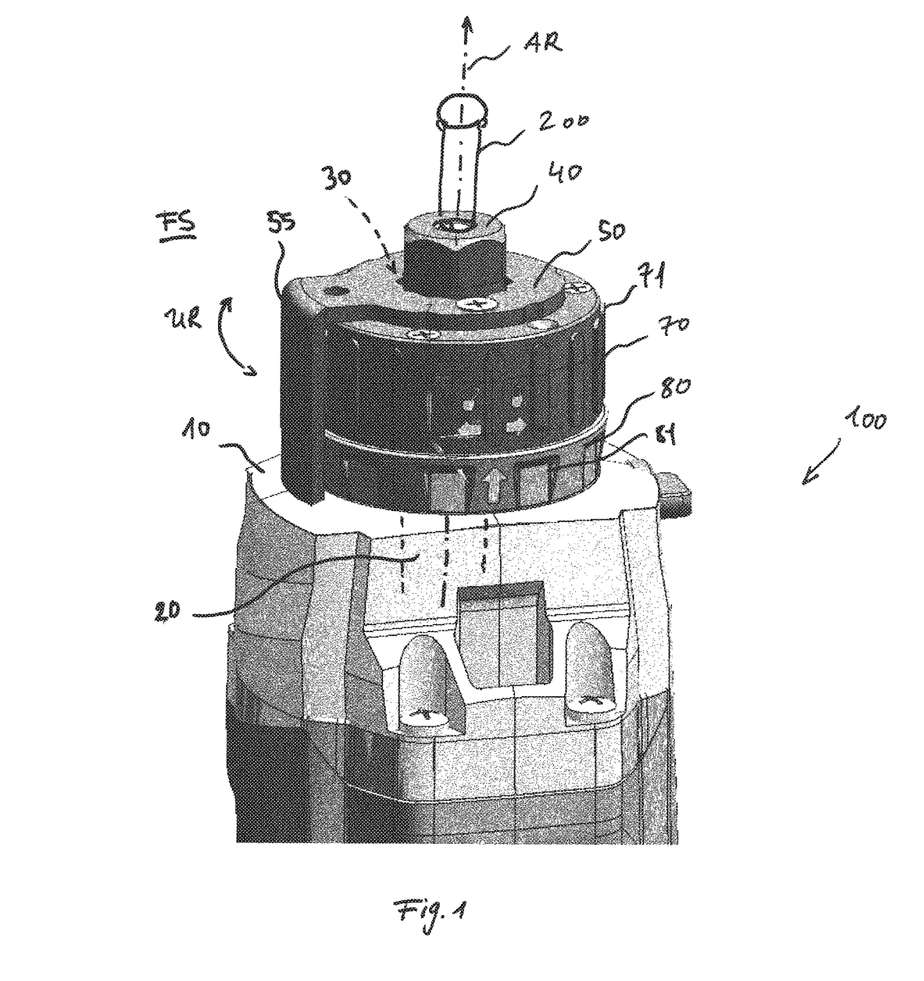
FIG. 1 is a perspective view of a preferred embodiment of a portable milling machine according to the invention.

FIG. 1 shows a portable milling machine 100 according to the invention. The portable milling machine 100 is equipped with a housing 10, a spindle 20 which extends inside the housing 10 and is thus indicated by dashed lines in this figure, and a clamping nut 40 which is part of a tool holder 30 comprising a clamping sleeve (not shown). The clamping nut 40 can be rotatably connected to the spindle 20 and detached therefrom in order to clamp and unclamp a milling tool 200. Both the spindle 20 and the clamping nut 40 have a mutually corresponding thread such that the clamping nut 40 can be screwed onto the spindle 20 and detached therefrom by being unscrewed.

Figure 3:
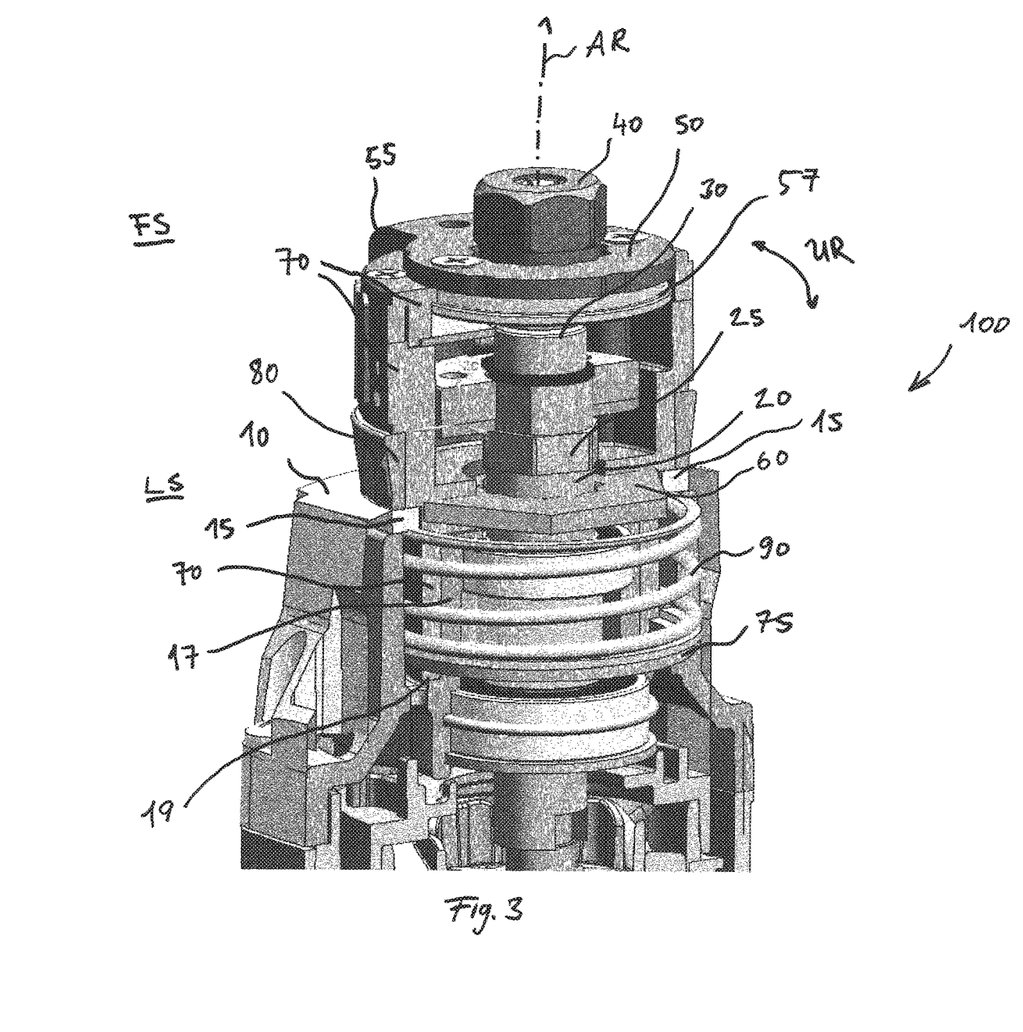
FIG. 3 is a partial sectional view of the embodiment from FIGS. 1 and 2, with the spanner in the disengaged position.
Figure 4:
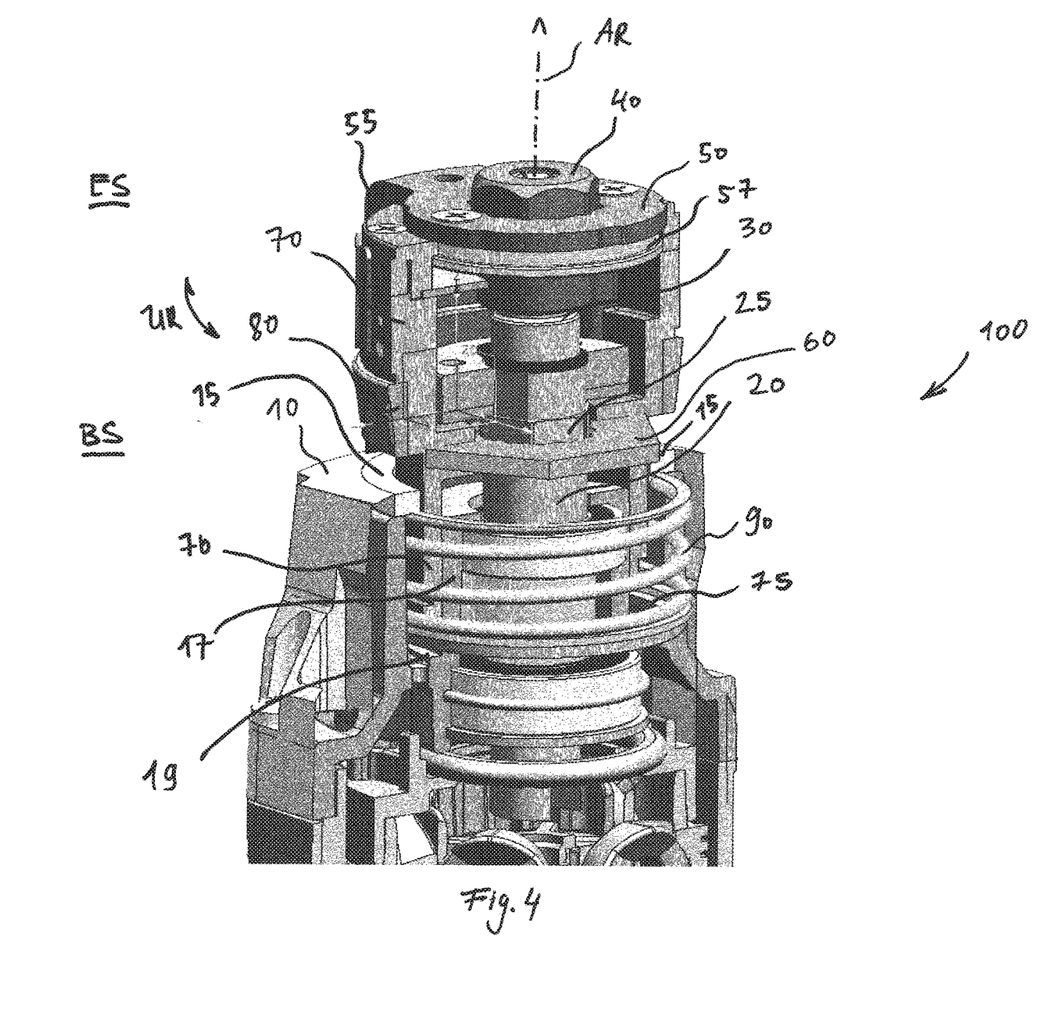
FIG. 4 shows the embodiment from FIG. 3, with the spanner in the engaged position.

The portable milling machine 100 has a spanner 50, which can be moved relative to the spindle 20 in the axial direction AR between a disengaged position FS (shown in FIGS. 1, 2 and 3) and an engaged position ES (see FIG. 4).

In the portable milling machine 100 from FIG. 1, the spanner 50 is connected to the housing 10 of the portable milling machine 100 for conjoint rotation. This connection for conjoint rotation is established by means of a guide arm 55, which is integrally connected to the spanner 50 in the embodiment shown in this figure. The guide arm 55 can be moved relative to the housing 10 of the portable milling machine 100 in relation to the axial direction AR. In order to move out of the disengaged position FS shown in this figure, the guide arm 55 can therefore be pushed further from the housing 10, the guide arm 55 always remaining able to rotate together with the housing 10 of the portable milling machine 100 in relation to the circumferential direction UR.

In the embodiment shown in FIG. 1, the clamping nut 40 has a hexagonal outer contour, whereas the spanner 50 has a dodecagon inner contour in the manner of a ring spanner. In the disengaged position FS shown in this figure, the clamping nut 40 is rotatable relative to the spanner 50, since the clamping nut 40 and the spanner 50 are not engaged.

If, on the other hand, the clamping nut 40 and the spanner 50 are engaged, i.e. if, in the engaged position ES, the spanner interlockingly surrounds the clamping nut 40 at least in portions, in the present case completely, in the circumferential direction UR (cf. FIG. 4), the clamping nut 40 is fixed in rotation in the axial direction AR. By manually rotating the spindle 20, the clamping nut 40 can be twisted off of the spindle 20 or twisted onto said spindle.

In order to move the spanner 50 in the axial direction AR out of the disengaged position FS shown in this figure and into the engaged position ES (cf. FIG. 4), the portable milling machine 100 has a lower sleeve 80 on the tool side, which is arranged coaxially with the spindle 20 and in turn comprises a manual operation surface 81 in the form of circumferentially distributed notches. By pushing the lower sleeve 80 in the axial direction AR, a tool-side upper sleeve 70 located above the lower sleeve 80 is simultaneously moved upward, as a result of which the spanner 50 is also moved upward in the axial direction AR.

By rotating the upper sleeve 70 in the circumferential direction, the spindle 20 which extends inside the housing 10 of the portable milling device 100 can be manually rotated. This will be explained in more detail with reference to the following figures.

Figure 2:
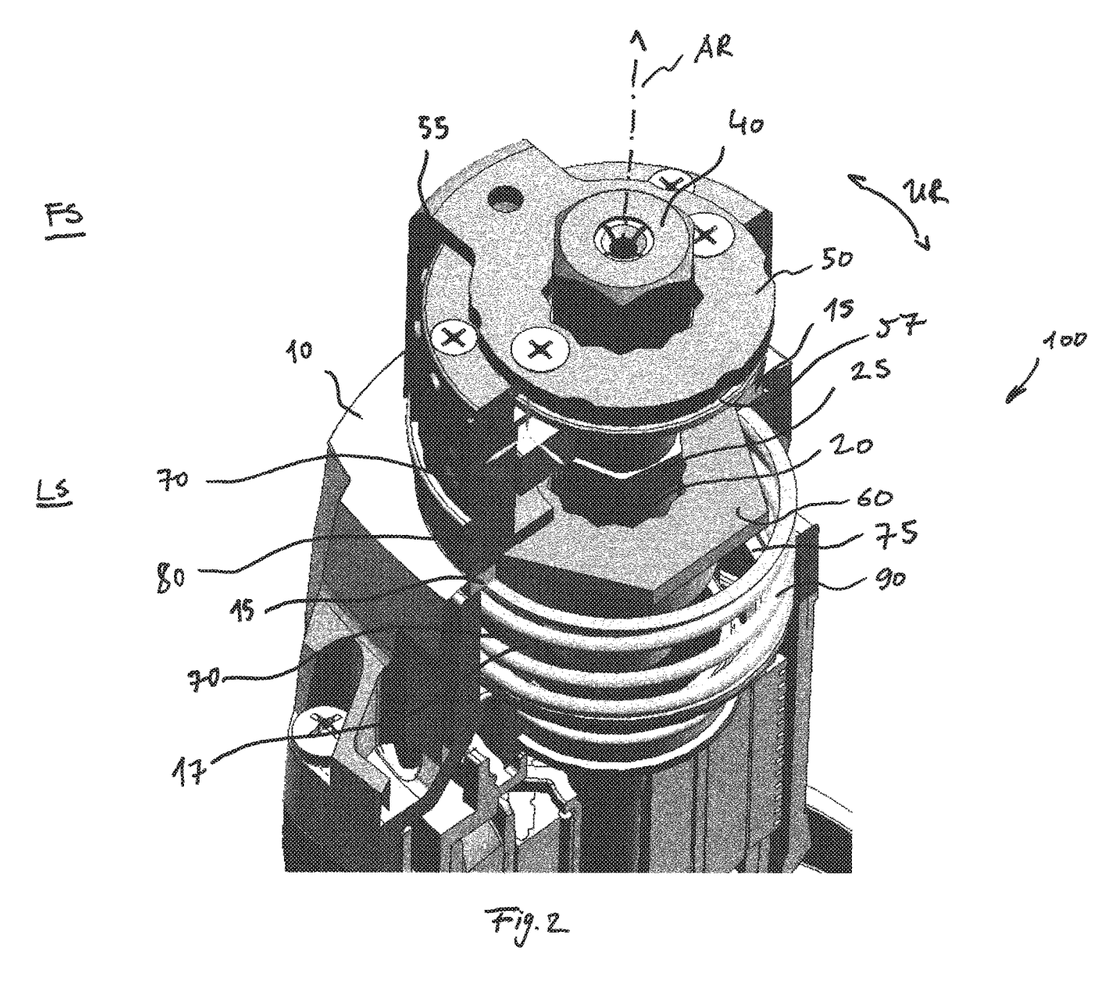
FIG. 2 is a partial sectional view of the embodiment from FIG. 1.

FIG. 2 is a partial sectional view of the portable milling machine 100 from FIG. 1. The top part of FIG. 2 clearly shows the spanner 50, which is connected to the housing 10 of the portable milling machine for conjoint rotation by means of the guide arm 55 integrally formed on said spanner. FIG. 2 again shows the disengaged position FS in which the spanner 50 surrounds the clamping nut 40, but does not form an interlocking connection therewith. In other words, the clamping nut 40 can freely rotate within the spanner 50. This is typically the case in normal milling operation.

Below the spanner 50, the portable milling machine 100 has a spindle key 60, which can be moved relative to the spindle 20 in the axial direction AR between a blocked position BS (cf. FIG. 4) and a released position LS shown in this figure.

In the blocked position BS (cf. FIG. 4), the spindle key 60 interlockingly surrounds an interlocking connection element in the circumferential direction UR, which element is formed on the spindle 20 and is in the form of a spindle nut 25. In the released position LS shown in this figure (FIG. 2), the spindle key 60 surrounds the spindle 20 continuously, only without an interlocking connection.

In the preferred embodiment shown in FIG. 2, the spindle nut 25 has a hexagonal outer contour and the spindle key 60 has a dodecagon inner contour.

FIG. 2 clearly shows that the upper sleeve 70, which has already been explained with reference to FIG. 1, is connected to the spindle key 60 for conjoint rotation. The spindle key 60 is interlockingly embedded in the upper sleeve 70. For this purpose, the spindle key 60 has in this figure, by way of example, an outside hexagonal contour. By rotating the upper sleeve in the circumferential direction UR, the spindle key 60 is therefore rotated in the circumferential direction UR. Therefore, if the spindle key is in the blocked position BS (as shown in FIG. 4), manual rotation of the upper sleeve 70 also results in manual rotation of the spindle 20 relative to the housing 10 in the circumferential direction UR.

The spanner 50 and the spindle key 60 are coupled in the axial direction AR such that the spindle key 60 being moved into the blocked position BS (cf. FIG. 4) simultaneously causes the spanner 50 to be moved into the engaged position ES (cf. FIG. 4). This axial coupling will now be explained in more detail with reference to FIG. 3.

FIG. 3 is a partial sectional view of the embodiment from FIGS. 1 and 2 from a different perspective. The upper sleeve 70 arranged on the tool side is cylindrical and is arranged coaxially with the spindle 20 and the lower sleeve 80. In this case, the upper sleeve 70 is mounted in part within the lower sleeve 80, the upper sleeve 70 and the lower sleeve 80 being rotatable relative to one another.

The upper sleeve 70 is cylindrically stepped, part of the upper sleeve 70 extending inside the housing 10 of the portable milling machine 100. The lower sleeve 80 extends only outside of the housing 10 of the portable milling machine 100.

As can be seen from FIG. 3, the upper sleeve 70 is located inside the housing 10 on a guide sleeve 17. In the disengaged position FS or released position LS shown in this figure, the guide sleeve 17 simultaneously defines a lower contact portion 19 for the upper sleeve 70. The upper sleeve 70 can slide along the guide sleeve 17 in the axial direction AR. This can be achieved by moving the lower sleeve 80 upward in the axial direction AR, the upper sleeve 70 and the lower sleeve 80 forming an interlocking connection in the axial direction AR by the upper sleeve 70 being mounted in the lower sleeve 80, as can be seen from FIG. 3.

In the state shown in FIG. 3, the upper sleeve 70 and the lower sleeve 80 are also supported on a support ring 15 of the housing 10 that is arranged coaxially with the spindle 20. As can also be seen from FIG. 3, the spanner 50 is screwed to a guide plate 57. The spanner 50 and the guide plate 57 are rotatable relative to the upper sleeve 70 in the circumferential direction UR, whereas, in relation to the axial direction AR, the spanner 50 and the guide plate 57 are interlockingly connected to the upper sleeve 70 and are thus axially coupled thereto. On account of this axial coupling, when the upper sleeve 70 is moved in the axial direction AR, which movement is in turn brought about by pushing the lower sleeve 80 up, the spindle key 60 and the spanner 50 are simultaneously brought out of the disengaged position FS and released position LS shown in this figure and into the engaged position ES and blocked position BS, illustrated with reference to FIG. 4, respectively.

In order to detach the clamping nut 40 from the spindle 20, the upper sleeve 70 and the lower sleeve 80 have to be pushed upward, as shown in FIG. 4. On account of the axial coupling between the upper sleeve 70 and the lower sleeve 80 described with reference to FIG. 3, the spanner 50 interlockingly surrounds the clamping nut 40 and the spindle key 60 simultaneously interlockingly surrounds the spindle nut 25.

A user manually pushes the lower sleeve 80 together with the upper sleeve 70 upward against the spring force of the adjustment spring 90. The adjustment spring 90 is in turn supported against a spring contact portion 75, which is fixed in position relative to the upper sleeve 70 in the axial direction AR, and the support ring 15 which is fixedly and non-rotatably arranged inside the housing 10.

The upper sleeve 70 can then be rotated, as a result of which the spindle key 60 that is arranged such that it can rotate together with the upper sleeve 70 is also rotated. Since the spindle key 60, as shown in FIG. 4, interlockingly surrounds the spindle nut 25, the spindle 20 is rotated together therewith. This results in rotation of the spindle 20 relative to the clamping nut 40, which is in turn held so as to be rotatable together with the housing 10 by the spanner 50 comprising the integrally formed guide arm 55.

In other words, the clamping nut 40 of the tool holder 30 is rotated by the spindle 20, since the spanner 50 is connected to the housing 10 for conjoint rotation and the upper sleeve 70 and the lower sleeve 80 can rotate relative to the housing 10, but at the same time the upper sleeve 70 is connected to the spindle 20 via the spindle key 60.

Figure 5:
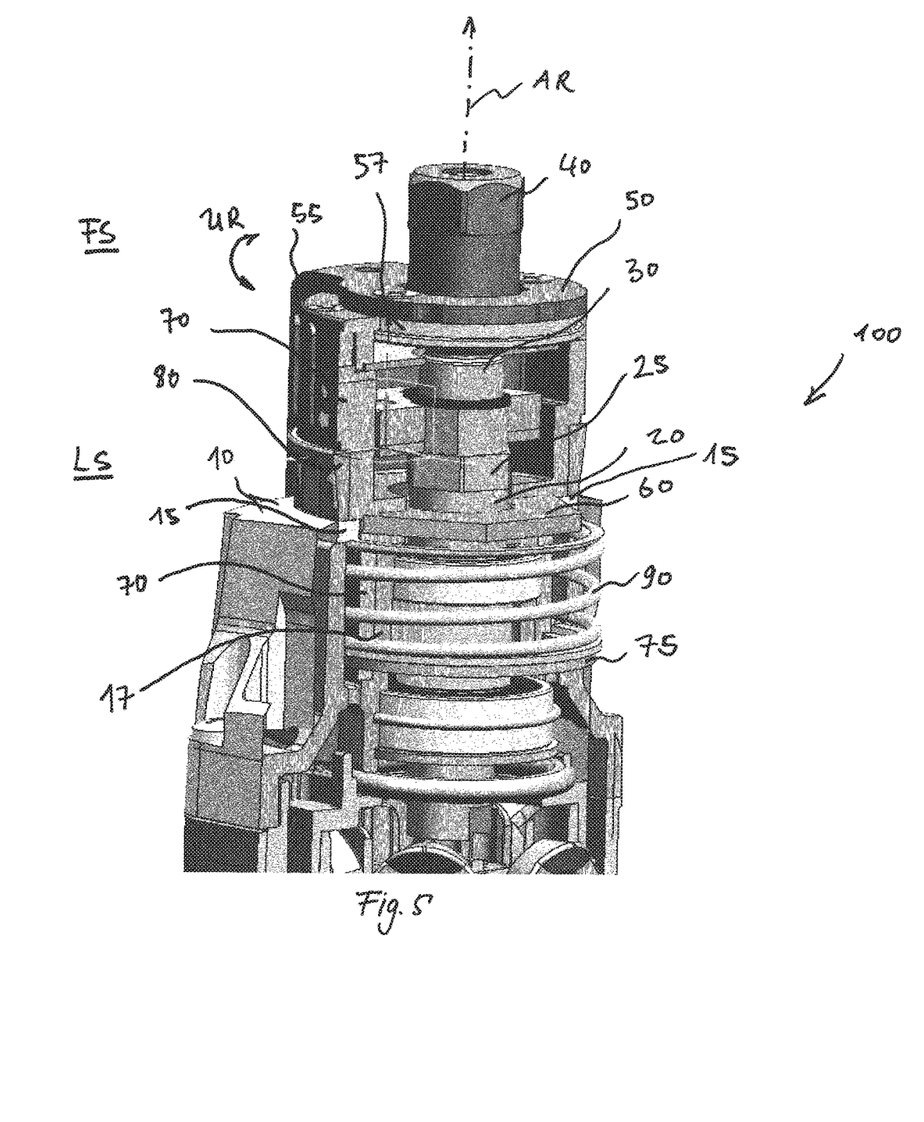
FIG. 5 shows the embodiment from the preceding figures, with the clamping nut twisted off of the spindle.

Finally, FIG. 5 shows the state in which the clamping nut 40 is screwed off of the spindle 20, i.e. is detached. In a next step, the clamping nut 40 can be removed. The user can then release the lower sleeve 80, with said sleeve moving back into the position shown in FIG. 5 as a result of the spring force of the adjustment spring 90.

It is clear from FIG. 1 to 5 in combination that, with practice, a clamping process can be performed using one hand, with a user first bringing the lower sleeve 80 into the position shown (FIG. 4) using his thumb and forefinger and holding the lower sleeve there, for example using his ring finger or little finger. The upper sleeve 70 can then be rotated in the circumferential direction UR by the thumb and forefinger. In a further embodiment, the lower sleeve 80 can have a latching mechanism to keep said sleeve spaced apart from the housing 10 in the axial direction AR. This can be achieved, for example, by a latching lug (not shown here) which is latched within the support ring 15.

LIST OF REFERENCE SIGNS

10 housing
15 support ring
17 guide sleeve
19 lower contact portion
20 spindle
25 spindle nut
30 tool holder
40 clamping nut
50 spanner
55 guide arm
57 guide plate
60 spindle key
70 upper sleeve
71 manual operation surface
75 spring contact portion
80 lower sleeve
81 manual operation surface
90 adjustment spring
100 portable milling machine
200 milling tool
AR axial direction
BS blocked position
ES engaged position
FS disengaged position
LS released position
UR circumferential direction

What is claimed is:
1. A portable milling machine comprising:
a housing;
a spindle;
a tool holder having a clamping nut rotatably connectable to the spindle and detachable from the spindle in order to clamp and unclamp a milling tool;
a spanner movable relative to the spindle axially between an engaged position and a disengaged position, the spanner interlockingly surrounding the clamping nut at least in portions in the circumferential direction in the engaged position and, when the spanner is in the disengaged position, the clamping nut being rotatable relative to the spanner, the spanner being connected to the housing for conjoint rotation such that, when the spanner is in the engaged position, the clamping nut is connectable to the spindle and detachable from the spindle by manually rotating the spindle; and
a spindle key movable relative to the spindle axially between a blocked position and a released position, the spindle key interlockingly surrounding an interlocking connection element at least in portions in the circumferential direction in the blocked position, the interlocking connection element being formed on the spindle, the spindle being rotatable relative to the spindle key when the spindle key is in the released position.

2. The portable milling machine as recited in claim 1 wherein the interlocking connection element is a spindle nut.

3. The portable milling machine as recited in claim 1 wherein the spindle key in the blocked position is rotatable relative to the housing of the portable milling machine in order to allow the spindle to be rotated manually.

4. The portable milling machine as recited in claim 1 wherein the spanner and the spindle key are axially coupled such that movement into the engaged position takes place at the same time as movement into the blocked position or movement into the disengaged position takes place at the same time as movement into the released position.

5. The portable milling machine as recited in claim 1 wherein the portable milling machine has an upper sleeve and a lower sleeve on a tool side, the upper sleeve and the lower sleeve each having a manual operation surface and being arranged coaxially with the spindle.

6. The portable milling machine as recited in claim 5 wherein the upper sleeve is connected to the spindle key for conjoint rotation such that, when the spanner is in the engaged position and the spindle key is in the blocked position, the clamping nut is connectable to the spindle and detachable from the spindle by manually rotating the upper sleeve.

7. The portable milling machine as recited in claim 5 wherein the upper sleeve and the lower sleeve are mounted so as to be rotatable relative to one another.

8. The portable milling machine as recited in claim 7 wherein the upper sleeve is mounted in the lower sleeve and fixed in position relative to the lower sleeve in the axial direction.

9. The portable milling machine as recited in claim 5 wherein the spanner is rotatable relative to the spindle key or rotatable relative to both the upper sleeve and the lower sleeve.

10. The portable milling machine as recited in claim 5 wherein the upper sleeve and the spindle key are together mounted so as to be movable away from the housing in the axial direction or are connected to the housing for conjoint rotation.

11. The portable milling machine as recited in claim 5 further comprising an adjustment spring having a spring force, the engaged position or the blocked position assumable against the spring force.

12. The portable milling machine as recited in claim 11 wherein the adjustment spring, acting as a compression spring acting between the lower sleeve and the housing, is arranged inside the housing.

13. The portable milling machine as recited in claim 1 wherein the spindle key continuously surrounds the spindle.

14. A portable milling machine comprising:
a housing;
a spindle;
a tool holder having a clamping nut rotatably connectable to the spindle and detachable from the spindle in order to clamp and unclamp a milling tool; and
a spanner movable relative to the spindle axially between an engaged position and a disengaged position, the spanner interlockingly surrounding the clamping nut at least in portions in the circumferential direction in the engaged position and, when the spanner is in the disengaged position, the clamping nut being rotatable relative to the spanner, the spanner being connected to the housing for conjoint rotation such that, when the spanner is in the engaged position, the clamping nut is connectable to the spindle and detachable from the spindle by manually rotating the spindle;
wherein the portable milling machine has an upper sleeve and a lower sleeve on a tool side, the upper sleeve and the lower sleeve each having a manual operation surface and being arranged coaxially with the spindle; and
wherein the upper sleeve is connected to a spindle key for conjoint rotation such that, when the spanner is in the engaged position and the spindle key is in the blocked position, the clamping nut is connectable to the spindle and detachable from the spindle by manually rotating the upper sleeve.

15. A portable milling machine comprising:
a housing;
a spindle;
a tool holder having a clamping nut rotatably connectable to the spindle and detachable from the spindle in order to clamp and unclamp a milling tool; and
a spanner movable relative to the spindle axially between an engaged position and a disengaged position, the spanner interlockingly surrounding the clamping nut at least in portions in the circumferential direction in the engaged position and, when the spanner is in the disengaged position, the clamping nut being rotatable relative to the spanner, the spanner being connected to the housing for conjoint rotation such that, when the spanner is in the engaged position, the clamping nut is connectable to the spindle and detachable from the spindle by manually rotating the spindle;
wherein the portable milling machine has an upper sleeve and a lower sleeve on a tool side, the upper sleeve and the lower sleeve each having a manual operation surface and being arranged coaxially with the spindle; and
wherein the upper sleeve and the lower sleeve are mounted so as to be rotatable relative to one another.

* * * * *